June 10, 1941.   C. C. BENNETT   2,244,934
AXLE STRAIGHTENER
Filed April 19, 1937    2 Sheets-Sheet 1

INVENTOR
CLAUDE C. BENNETT
BY
ATTORNEY

June 10, 1941.    C. C. BENNETT    2,244,934
AXLE STRAIGHTENER
Filed April 19, 1937    2 Sheets-Sheet 2

INVENTOR
CLAUDE C. BENNETT
BY
ATTORNEY

Patented June 10, 1941

2,244,934

UNITED STATES PATENT OFFICE 2,244,934

AXLE STRAIGHTENER

Claude C. Bennett, South Bend, Ind., assignor to A. E. Feragen, Inc., Seattle, Wash., a corporation of Washington Application April 19, 1937, Serial No. 137,616

2 Claims. (Cl. 153—48)

This invention relates to axle presses, that is, to machines or tools for bending axles, bars and various heavy metal members. It is of particular value in the adjustment or alignment of vehicle axles, and will hereafter be described in connection with such uses.

It is an object of my invention to provide a simple means, easily applied to the axle, or other portion of the frame or chassis or an automotive vehicle, whereby a bend may be produced therein quickly and easily, as for instance by the use of a double acting screw pusher or jack.

It is a further object to provide a device of this type, wherein the point or points of application of the force can be better controlled and fixed definitely and in which the members employed may not move relatively to one another during the bending operation and as a result of the forces generated at such time.

It is a further object to provide a push-pull device of simple structure for effectively bending heavy axles. A device that may be handled without difficulty and easily and quickly put into operative position.

It is a further object to provide an axle straightening means adaptable to axles of various cross-sections.

It is an especial object of this invention to provide means of the general character indicated, whereby the axle may be bent outside of the spring perches, where it is bent only with considerable difficulty, without bending the axle at any other point, as for example at the center where it is weak and more easily bent.

My invention is useful upon automobiles which are provided with a front axle of general I beam section curved or inclined upwardly at its ends and provided with the usual spring perch a short distance inward of the end.

The space between the spring perch and the king pin bolt in all cars is limited. Accordingly, it is a further object to provide a device for bending axles operable within narrow limits.

To the above ends, there is provided, in a preferred embodiment of the invention, a machine comprising plurality of screw push-pull device adjustably mounted upon a bed plate and adapted to operate a plurality of bending bars engaging the axle.

Other objects of the invention and desirable details of construction and combinations of parts will become apparent from the following description of a preferred embodiment, taken in conjunction with the accompanying drawings, in which.

Figure 1:
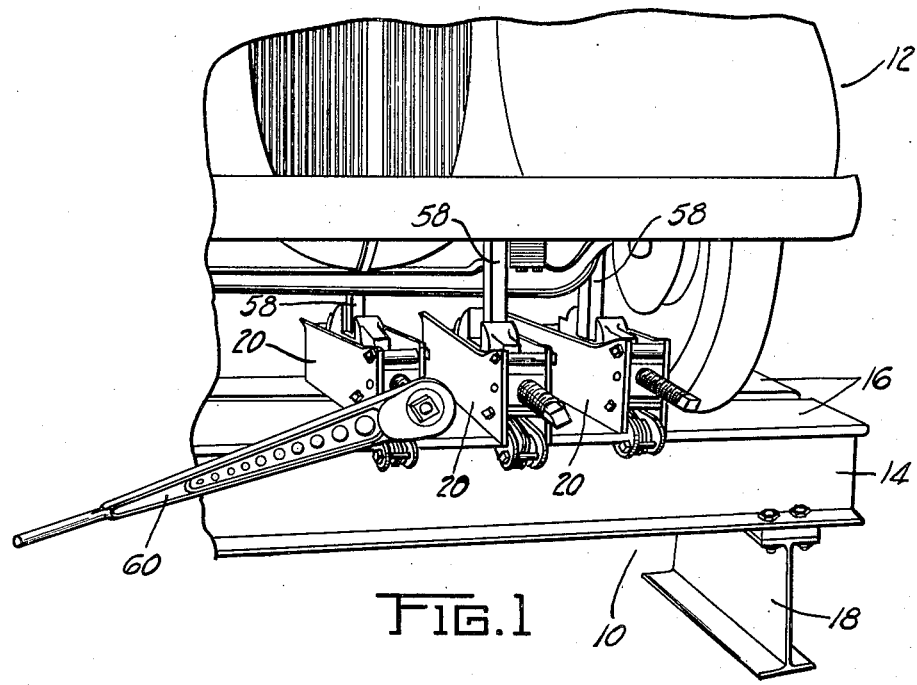
Figure 1 is a perspective of a portion of an automotive vehicle showing one form of my invention in operative position.
Figure 2:
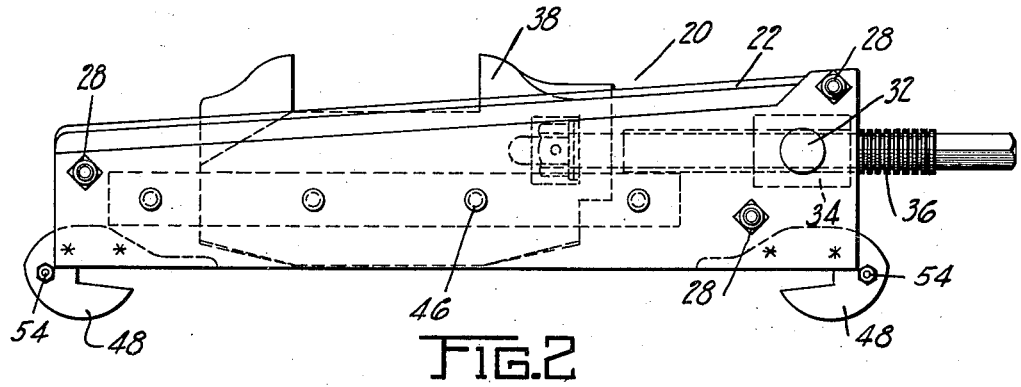
Figure 2 is a side elevation, with parts thereof disclosed in dotted lines, of one of the push-pull devices of my invention.
Figure 3:
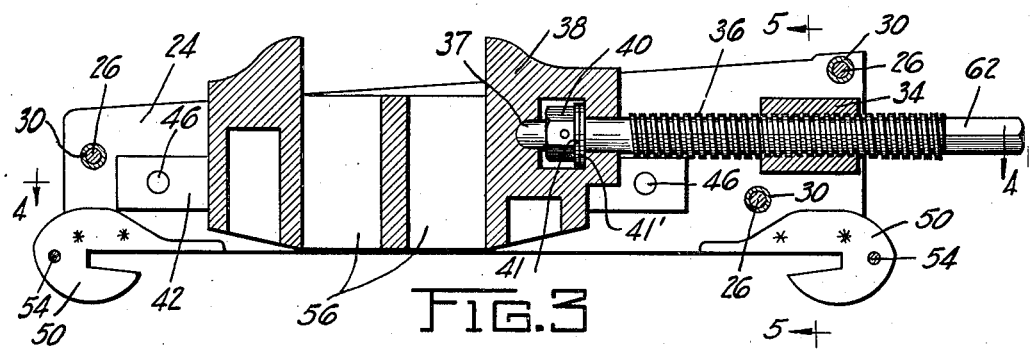
Figure 3 is a longitudinal sectional view of the device illustrated in Figure 2.

In that embodiment of my invention disclosed in the several figures of the drawings there is provided a bed plate 10 of any suitable construction, but of sufficient strength to support at least the front portion of an automotive vehicle 12 and withstand the stress and strain incident to the operation of the axle straightening described hereinafter. As disclosed in Figure 1 of the drawings, I prefer a bed plate or so-called table member constructed in any suitable manner but preferably comprising juxtaposed channel members 14 covered by plates 16, supported on I beams 18, one of which is disclosed in the figure.

Two or more axle straightening devices 20 are slidably mounted upon the plates 16 either before or after the vehicle is mounted thereon. These devices, which incidentally are duplicates of one another, are disclosed in their assembled relation in Figure 1.

Figure 4:
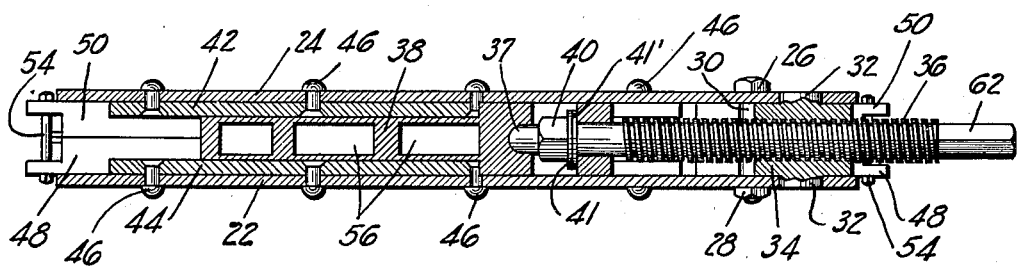
Figure 4 is a longitudinal sectional view substantially on line 4—4 of Figure 2.
Figure 5:
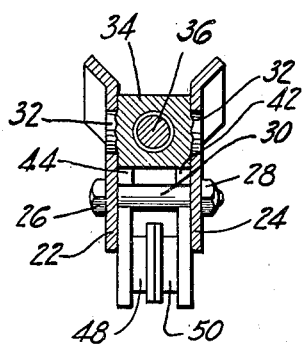
Figure 5 is a cross sectional view substantially on the line 5—5 of Figure 3.

As clearly disclosed in Figure 4, each device comprises two rectangular-shaped side plates or rails 22 and 24, preferably fashioned of a suitable steel stock. The rails are secured together by fastening means such as bolts 26 and nuts 28, and suitable spacers 30 sleeved on the bolts between the rails so as to provide a housing for the remaining elements of the device. Adjacent one end of the housing there is mounted, by means of trunnion pins 32, a nut member 34 internally threaded to receive a screw 36. The latter member is preferably rounded at its inner end 37 to fit in a socket in an enlarged end portion of a movable body member 38. A nut 40, fitting within a transverse opening in the member 38 and threaded on the screw 36, abuts a convex thrust washer 41 bearing against a concave thrust washer 41' seated on the wall defining the opening. The nut 40 and washers, together with the rounded end 37 of the screw, serve as force transmitting means in moving the body member 38 either forwardly or backwardly within the housing.

The member 38 is mounted to slide upon rectangular-shaped guide plates 42 and 44, one of said plates being fixedly secured, preferably by rivets 46, to each of the rails. Secured to the housing at each end thereof are abutment members 48 and 50, each of said members being hook-like in shape. Preferably the abutments comprise two sections, each section being welded or otherwise suitably secured to the side rails. The sections of the hooks may also be secured together by fastenings 54.

Describing now the operation of the machine and incidentally completing the detail description of the parts thereof, the devices 20 are positioned beneath that portion of the axle to be straightened, whereupon the operator places, in one or the other of pockets 56 of the body member 38, a straightening bar 58. The straightening bar 58 is fitted in either one or the other of the pockets 56 of the body member 38 with the upper end of the bar 58 engaging the work, and force is applied to move the body member in one direction or the other. As disclosed in Figure 1 the front axle of an automotive vehicle is being straightened, however the machine is equally effective in straightening the rear axle. The bars may be positioned to engage either the inner or the outer face of the axle. However, as disclosed in Figure 1, to obtain the best results it is desirable to position the end bars 58 on one side of the axle and the intermediate bar 58 on the other side.

The operator may, of course, employ more than three devices or only two thereof: furthermore, he may position and group the straightening bars to best effect the desired result. For example, the machine is quite effective in straightening that portion of the axle between the spring perch and the king pin.

After placing the bars in the desired position, the operator, preferably using a bridge wrench 60 mounted upon a square shank portion 62 of the screw 36, moves the bars 58 relative to each other and into engagement with the axle. The results, of course, depend upon such factors as the relative positions of the bars, their number and the applying force exerted by the operator.

It is, of course, to be understood that the devices may be so employed as to apply force in either one of two directions, that is, the central device of the group illustrated may be operated to apply force to the axle substantially centrally between the two end devices, and the end devices may be operated either concomitantly or independently. It is also to be understood that these operations may be easily and quickly reversed, simply by shifting the bending bars 58 in the pockets 56. Accordingly, it is clear that the device may be employed for any push-pull action that may be desired.

There is thus provided a simple, effective and efficient machine for straightening not only the axle of an automotive vehicle but other portions of the frame or chassis thereof. Furthermore, the machine is adapted to straighten any bar which may be rigidly supported over the bed frame and screw pushers.

While one illustrative embodiment has been described, it is not my intention to limit the scope of the invention to that particular embodiment, or otherwise than by the terms of the appended claims.

I claim:

1. An apparatus of the class described comprising corresponding parallel side rails, oppositely disposed hooks secured between the rails and depending therefrom at the ends thereof for embracing a fixed support, a member slidable longitudinally between the rails having spaced pockets therein normal to the longitudinal axis of the member, a bar adapted to fit in either of the pockets, a screw mounted for travel between the rails, and means connecting the screw to the member.

2. In an axle bending machine, a bed plate having forwardly and rearwardly extending flange members, a pair of force applying means comprising body members having hooked segments adapted to each engage one of said forward and rearwardly extending flange members, motion transmitting means including a threaded element in each of said body members, each of said body members having a movable member including pockets connected with and actuated by the threaded elements, and bending bars received in one of said pockets of each movable member and engaging opposite sides of the axle to exert a bending force on the axle as the movable members are actuated by the threaded elements.

CLAUDE C. BENNETT.